Patented Jan. 27, 1948

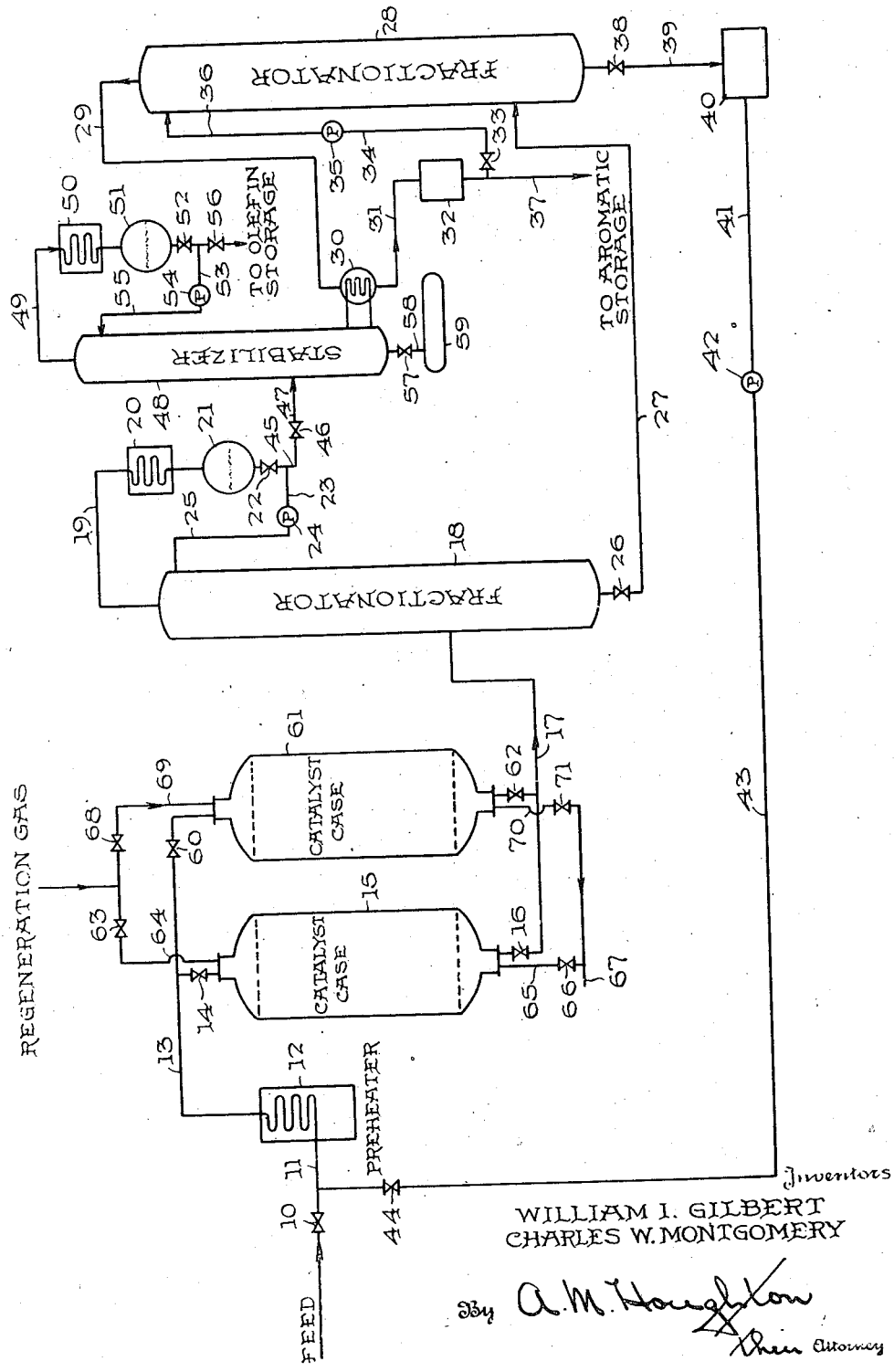

2,435,038

UNITED STATES PATENT OFFICE 2,435,038

CATALYTIC DEALKYLATION OF ALKYL AROMATIC COMPOUNDS

William I. Gilbert, New Kensington, and Charles W. Montgomery, Oakmont, Pa., assignors to Gulf Research & Development Company, Pittsburgh, Pa., a corporation of Delaware Application June 13, 1944, Serial No. 540,066

6 Claims. (Cl. 260—621)

This invention relates to an improved process for the catalytic dealkylation of alkyl aromatic compounds and, more particularly, it relates to an improved process for producing phenols and olefins by the dealkylation of alkylated phenols having at least one alkyl substituent containing three or more carbon atoms.

The dealkylation of alkyl aromatic compounds is a useful method of providing valuable materials for the manufacture of drugs, dyes, plasticizers and the like. The dealkylation of alkyl phenols, in addition to providing such useful chemical compounds and intermediates, also provides a process for isolating in pure form certain phenols which cannot be separated from their isomers in the unalkylated form. For example, meta- and para-cresol cannot be separated by ordinary means such as by fractional distillation, since there is a difference of only 0.8° C. in their boiling points. However, by alkylating a commercial mixture of meta- and para-cresol with isobutylene, the two products, di-tertiary-butyl meta-cresol and di-tertiary-butyl para-cresol, can be separated by fractional distillation since their boiling points are 17° C. apart. Either or both of the pure cresol isomers can then be produced by debutylating the di-butylated compounds.

Dealkylation of alkyl aromatic compounds such as alkyl phenols can be accomplished either thermally or with the aid of a catalyst. Thermal dealkylation is, in general, inefficient because at the temperatures required for dealkylation, secondary reactions occur which lower the yield of the desired products and form undesirable by-products which make the recovery and purification of the desired products more difficult. Known catalytic processes of dealkylating alkyl aromatic compounds using either solid or liquid catalysts also are subject to certain disadvantages. Processes which use the oxides, sulfides and silicates of nickel, iron, aluminum, zinc, barium and cadmium in conjunction with added hydrogen are difficult and expensive to operate. Acid catalysts such as have been used heretofore in the dealkylation of alkyl phenols are often corrosive to the dealkylation apparatus under conditions of operation. And in general none of the catalysts have been capable of regeneration and re-use at a sufficiently low cost nor have they been sufficiently rugged to make their re-use commercially desirable.

It is an object achieved by this invention to provide an improved method for the catalytic dealkylation of alkyl aromatic compounds in which the catalyst used is commercially available at low cost, is non-corrosive to dealkylation apparatus and can be regenerated and re-used repeatedly.

It is more particularly an object of this invention to provide an efficient and economical method for the production of phenols and olefins from alkyl phenols having at least one alkyl substituent containing three or more carbon atoms, by dealkylating said alkyl phenols in the presence of a cheap, readily available, non-corrosive, rugged and re-usable catalyst which is capable of effecting substantially complete dealkylation of the alkylated phenol without excessive polymerization of the olefin products of the dealkylation.

By the term "dealkylation" and the like as used herein and in the appended claims is meant an operation in which relatively large alkyl groups such as those containing three or more carbon atoms are split off from an alkyl aromatic compound without removing such methyl and ethyl groups as may be present.

In accordance with the present invention, it has been found that the disadvantages heretofore attendant upon the catalytic dealkylation of alkyl aromatic compounds may be obviated and that alkyl aromatic compounds, such as alkyl phenols, can be dealkylated by contacting such compounds at temperatures above about 200° C. with active clays. These clay catalysts are readily available and cheap and have little tendency to effect polymerization of the olefin products produced, do not cause corrosion of the metal of the aparatus in which the dealkylation is carried out and can be regenerated and re-used a number of times.

For example, by contacting an alkyl phenol having one or more alkyl substituents each containing three or more carbon atoms with an active clay at a temperature above about 200° C., dealkylation of the alkyl phenol and the production of a simple phenol and an olefin can be effected with a minimum of polymerization or other objectionable side reactions. Similarly, by dealkylation of an alkylated aromatic hydrocarbon such as an alkyl benzene or alkyl naphthalene, by contact with clay above about 200° C., the corresponding aromatic hydrocarbon and olefin can be produced with little polymerization or other side reactions. A method is thus provided which may be used commercially with advantage because substantially no corrosion of the metal parts of the apparatus takes place while commercial rates of reaction comparable with those obtained, for example, with a sulfuric acid dealkylation catalyst, can be maintained.

The active clays which we have found suitable as catalysts for the purposes of our invention include such materials as Georgia clay, Floridin, Attapulgus clay, diatomaceous earth, fuller's earth and the like. These clays are customarily used in the form of 30 to 60-mesh granules, although smaller "fluid" type particles or larger granules or pellets may be used. When these clay catalysts are used fresh their activity is somewhat higher than after repeated use and regeneration. This is evidenced by the fact that after operation with the same catalyst over a relatively long period, the amount of partially dealkylated charge to be found in the products increases somewhat while any tendency to form polymers disappears almost entirely, whereas with fresh catalyst substantially no partially dealkylated charge is obtained and a small amount of polymer is formed.

The temperatures required for dealkylation using a clay catalyst according to our invention vary with the particular alkylated aromatic compound being treated. In general, temperatures between about 200° and 600° C. are required. Alkyl phenols can be dealkylated with clay catalysts at relatively low temperatures within this range, and particularly good results have been obtained at temperatures of about 250° to 300° C. Higher temperatures are usually required for the dealkylation of alkyl aromatic hydrocarbons such as alkyl benzene or alkyl naphthalene compounds, and it is usually desirable to effect dealkylation of such compounds at a temperature of 500° to 550° C.

The time of contact of the alkyl aromatic compound being dealkylated, with the clay catalyst, may be regulated to vary the yield of dealkylation products. In vapor phase operation using a fixed bed of clay catalyst at a temperature of about 200° to 600° C., we have found it particularly advantageous to use space velocities of 0.2 to 3.0. Space velocity as used herein is measured by the volume of liquid charged per hour per volume of catalyst.

The dealkylation of alkyl aromatic compounds, according to our invention, may be carried out in a variety of ways. For example a fixed bed, moving bed, or suspended catalyst may be used. In the accompanying drawing, there is illustrated schematically one form of apparatus for effecting dealkylation in a substantially continuous operation with a fixed catalyst bed, as described hereinafter.

The compound to be dealkylated is introduced through valve 10 and conduit 11 into a preheater 12 where it is vaporized and heated to a temperature between 200° and 600° C. Vapors from the pre-heater are then passed through conduit 13 and valve 14 into the top of catalyst case 15 which may be filled for example with granular Georgia clay. The temperature of the catalyst is maintained at the desired dealkylation temperature between 200° and 600° C. by suitable means (not shown).

The dealkylation products are conducted from the bottom of catalyst case 15 through valve 16 and conduit 17 to a fractionating column 18 where the olefinic products are taken overhead and are conducted through conduit 19 into condenser 20 and receiver 21. Reflux for column 18 is provided from the receiver 21 through valve 22, conduit 23, pump 24 and conduit 25 to the head of column 18. The aromatic dealkylation products together with undealkylated materials are taken from the bottom of column 18 through valve 26 and conduit 27 to fractionating column 28 where they are fractionated, and a pure dealkylated aromatic product is taken overhead through conduit 29, reboiler 30 and conduit 31 into a receiver 32. Reflux for column 28 is provided from the receiver 32 through valve 33, conduit 34, pump 35, and conduit 36 to the top of column 28. The pure aromatic dealkylation product is collected through conduit 37 in suitable storage means. The bottoms from column 28, which consist largely of undealkylated charge, are recycled through valve 38, conduit 39, collection tank 40, conduit 41, pump 42, conduit 43 and valve 44 to the inlet feed line 11.

The olefinic distillate from column 18 which has been collected in receiver 21 may be transferred through valve 22, conduit 45, valve 46 and conduit 47 to a stabilizer 48 heated by reboiler 30. The distillate from column 48 is conducted through conduit 49 into condenser 50 and is collected in a receiver 51. Reflux for column 48 is provided through conduit 52, valve 53, pump 54 and conduit 55 to the top of column 48. The pure olefin is conducted from receiver 51 through valve 56 to suitable storage or, for example, to an alkylation unit. The bottoms from column 48 which consist of any polymerization by-products are removed through valve 57 and conduit 58 and collected in tank 59.

When the catalyst in catalyst case 15 has been exhausted, valves 14 and 16 are closed and valve 60 is opened, which admits the charge to alternate catalyst case 61. The products from catalyst case 61 are conducted through valve 62 and conduit 17 to fractionation tower 18 and the remainder of the apparatus, as before. While the charge is being conducted through catalyst case 61, the catalyst in case 15 may be regenerated by introducing a regeneration gas consisting of air and flue gas through valve 63 and conduit 64 into the top of catalyst case 15. Products of regeneration are discharged through conduit 65, valve 66 and conduit 67. Alternatively, the catalyst contained in case 15 may be removed for regeneration and replaced at once by fresh catalyst. When catalyst case 15 has been regenerated, the charge may again be introduced into the top of case 15 by opening valve 14 and closing valve 60 and the products conducted from the bottom of case 15 through valve 16 and conduit 17 to fractionation tower 18. Catalyst case 61 may then be regenerated by introducing regeneration gases into the top of the tower through valve 68 and conduit 69 and conducting the regeneration gases out through conduit 70, valve 71 and conduit 67.

Thus, by use of this apparatus in which alternate catalyst cases are provided, substantially continuous operation can be effected with good yields of pure olefin and pure aromatic compounds.

In the following specific examples, there are illustrated the results obtainable by the dealkylation of alkyl aromatic compounds according to the method of our invention using active clay catalysts at temperatures between 200° and 600° C.

EXAMPLE I

In this example, di-tertiary-butyl metacresol was dealkylated by contacting the di-butyl-meta-cresol with fresh Georgia clay at a temperature of 260° C. and at various space velocities between 0.2 and 3.0. The following table illustrates in runs 1–4 the results obtained at the respective space velocities. In column 5 of Table I, there are also shown the results obtained in the debutylation of di-tertiary-butyl para-cresol at a temperature of 260° C. and space velocity of 0.42.

Table I

| Run No | 1 | 2 | 3 | 4 | 5 |
|---|---|---|---|---|---|
| Temperature, °C | 260 | 260 | 260 | 260 | 260 |
| Space Velocity | 0.23 | 0.65 | 1.00 | 2.13 | 0.42 |
| Recovery, wt. per cent | 93.5 | 91.5 | 95.5 | 98.5 | 102.2 |
| Product: | | | | | |
| Cresol, wt. per cent of chg | 47.9 | 45.7 | 47.2 | 49.2 | 48.2 |
| Polymer, wt. per cent of chg | 2.5 | 3.6 | 3.9 | 2.9 | 3.2 |
| Isobutylene, wt. per cent of chg | 43.2 | 42.2 | 43.2 | 46.4 | 49.0 |
| Yield, per cent of theoretical: | | | | | |
| Cresol | 97.5 | 95.7 | 96.4 | 93.2 | 98.5 |
| Butylene (C₄+polymer) | 90.0 | 92.4 | 92.5 | 88.8 | 102.8 |

From the results shown in Table I, it will be apparent that substantially theoretical yields of phenols are obtainable according to the process of our invention. The amount of cresol obtained was very near the theoretical quantity in each case and little or no evidence was shown of partial dealkylation to a mono-butyl cresol. Also, losses were slight and the amount of fixed gases formed was negligible.

EXAMPLE II

In this example, dealkylation of di-tertiary-butyl meta-cresol was carried out with a fresh Georgia clay catalyst at a variety of temperatures higher than 260° C. and a fixed space velocity of about 0.23. The results of these runs are shown in the following Table II.

Table II

| Run No | 1 | 2 | 3 | 4 | 5 |
|---|---|---|---|---|---|
| Temperature, °C | 260 | 350 | 400 | 465 | 500 |
| Space Velocity, liq | 0.23 | 0.22 | 0.24 | 0.22 | 0.23 |
| Products, wt. per cent of charge: | | | | | |
| Liquid | 50.4 | 48.7 | 48.7 | 51.2 | 46.9 |
| Cond. Gas | 43.2 | 42.4 | 45.0 | 41.4 | 43.1 |
| Loss, wt. per cent | 6.4 | 8.9 | 6.3 | 7.4 | 10.0 |
| Anal. of cond. gas, mol. per cent: | | | | | |
| Air and CH₄ | | | 0.8 | 0.3 | 1.6 |
| C₂H₆ | | | | 0.1 | 0.3 |
| C₂H₄ | | | | 0.6 | |
| C₃H₈ | | | | 0.3 | 0.6 |
| C₃H₆ | | | | 1.6 | 2.7 |
| i-C₄H₁₀ | 1.7 | 2.1 | 2.71 | 9.1 | 12.2 |
| n-C₄H₁₀ | | | | | 0.3 |
| i-C₄H₈ | 93.0 | 92.1 | 88.8 | 84.1 | 78.6 |
| C₅+sats | | | 0.3 | 0.2 | 0.3 |
| C₅+unsats | | | 3.8 | 3.2 | 3.4 |

In these results, as in the prior results shown in Table I, dealkylation was substantially complete, and no detectable amount of mono-tertiary-butyl meta-cresol was found in the products. However, a saturating effect was observed in the olefin fraction. As higher temperatures were used, increasing amounts of the isobutylene product are converted to isobutane. From these results, it will be apparent that when it is desired to obtain olefinic products without conversion to paraffins, temperatures not substantially above 260° C. are most desirable. On the other hand, if it is desired to obtain a substantial proportion of saturated isoparaffin in the products, higher temperatures are effective to produce a mixture of isobutane with isobutylene.

EXAMPLE III

In this example, the effectiveness of the process of our invention in the dealkylation of alkyl aromatic hydrocarbons is illustrated. Amyl benzene, tertiary-butyl benzene, di-ethyl benzene and cumene were dealkylated by contacting with Georgia clay at temperatures between 350° and 500° C. The results of these tests are shown in the following Table III.

Table III

| Run No | 1 | 2 | 3 | 4 | 5 | 6 |
|---|---|---|---|---|---|---|
| Charge | Amyl Benzene | Amyl Benzene | t-Butyl Benzene | t-Butyl Benzene | Di Ethyl Benzene | Cumene |
| Temperature, °C | 400 | 500 | 500 | 350 | 540 | 500 |
| Space Velocity | 0.25 | 0.23 | 0.25 | 0.27 | 1.02 | 0.24 |
| Dealkylation, mol. per cent | 28.2 | 52.9 | 84.3 | 46.3 | 3.2 | 42.0 |

From the data here obtained, it will be observed that effective dealkylation of such compounds is also obtainable according to the method of our invention. These tests also show evidence of the saturating effect observed in connection with the dealkylation of alkyl phenols at higher temperatures. For example, in runs 1 and 2 the C₅ fractions contained approximately 10 per cent pentanes and the gas from runs 3 and 4 contain 2 to 3 per cent of isobutane. No propane was found in the gas obtained from the dealkylation of cumene.

While our invention has been described herein in detail with respect to certain specific embodiments thereof, it is to be understood that the invention is not limited to the details of such embodiments except as hereinafter defined in the appended claims.

What we claim is:

1. A process for producing isobutylene which comprises contacting a mono-hydric tertiary-butyl phenol with an active clay catalyst at a temperature between about 250° C. and about 300° C.

2. A process for producing isobutylene which comprises contacting a tertiary-butyl cresol with an active clay catalyst at a temperature between about 250° C. and about 300° C.

3. A process for producing isobutylene which comprises contacting a di-(tertiary-butyl)-cresol with an active clay catalyst at a temperature between about 250° C. and about 300° C.

4. A process for producing isobutylene which comprises contacting a mono-(tertiary-butyl)-cresol with an active clay catalyst at a temperature between about 250° C. and about 350° C.

5. A process for producing isobutylene which comprises contacting di-(tertiary-butyl)-metacresol with an active clay catalyst at a temperature between about 250° C. and about 300° C.

6. A process for producing isobutylene which comprises contacting di-(tertiary-butyl)-metacresol in vapor phase with Georgia clay at a temperature of about 260° C. at a space velocity between about 0.2 and about 3.0, and thereafter separating isobutylene from the reaction mixture.

WILLIAM I. GILBERT.
CHARLES W. MONTGOMERY.

REFERENCES CITED

The following references are of record in the file of this patent:

UNITED STATES PATENTS

| Number | Name | Date |
|---|---|---|
| 1,747,604 | Schollkopf | Feb. 18, 1930 |
| 2,194,449 | Sachanen et al. | Mar. 19, 1940 |
| 2,222,632 | Sachanen et al. (A) | Nov. 26, 1940 |
| 2,223,133 | Sachanen et al. (B) | Nov. 26, 1940 |
| 2,290,603 | Stevens | July 21, 1942 |
| 2,295,672 | Meharg et al. | Sept. 15, 1942 |
| 2,295,674 | Meharg | Sept. 15, 1942 |
| 2,327,938 | Stevens et al. | Aug. 24, 1943 |